(12) United States Patent
Chen et al.

(10) Patent No.: US 7,497,618 B2
(45) Date of Patent: Mar. 3, 2009

(54) MOBILE VEHICLE INSPECTION SYSTEM

(75) Inventors: Zhiqiang Chen, Beijing (CN); Kejun Kang, Beijing (CN); Haifeng Hu, Beijing (CN); Yuanjing Li, Beijing (CN); Hua Peng, Beijing (CN); Chuanxiang Tang, Beijing (CN); Shangmin Sun, Beijing (CN); Yinong Liu, Beijing (CN); Jianmin Li, Beijing (CN); Junli Li, Beijing (CN); Li Zhang, Beijing (CN); Yaohong Liu, Beijing (CN); Nan Jiang, Beijing (CN); Zhongrong Yang, Beijing (CN); Tao Wang, Beijing (CN)

(73) Assignees: Tsinghua University, Beijing (CN); Nuctech Company Limited, Beijing (CN)

(*) Notice: Subject to any disclaimer, the term of this patent is extended or adjusted under 35 U.S.C. 154(b) by 0 days.

(21) Appl. No.: 11/974,458

(22) Filed: Oct. 12, 2007

(65) Prior Publication Data

US 2008/0089469 A1    Apr. 17, 2008

(30) Foreign Application Priority Data

Oct. 13, 2006    (CN) ................... 2006 1 0113719

(51) Int. Cl.
*H05G 1/02*    (2006.01)
(52) U.S. Cl. ........................ 378/198; 378/57
(58) Field of Classification Search .......... 378/57, 378/193–198
See application file for complete search history.

(56) References Cited

U.S. PATENT DOCUMENTS

| | | | | |
|---|---|---|---|---|
| 5,692,028 A | * | 11/1997 | Geus et al. | 378/57 |
| 5,903,623 A | | 5/1999 | Swift et al. | 378/57 |
| 6,843,599 B2 | | 1/2005 | Le et al. | 378/198 |

(Continued)

FOREIGN PATENT DOCUMENTS

CN    1295247 A    5/2001

(Continued)

OTHER PUBLICATIONS

Chinese language International Search Report and Written Opinion dated Jan. 24, 2008 issued in Application No. PCT/CN2007/002889, 9 pages.

(Continued)

*Primary Examiner*—Courtney Thomas
(74) *Attorney, Agent, or Firm*—Osha • Liang LLP

(57) ABSTRACT

A mobile vehicle inspection system includes a moving device; a driving device for driving the moving device to move during scanning inspection; a radiation source disposed on the moving device for emitting a ray; a rotary table pivotally disposed on the moving device; an upright post installed on the rotary table at a lower end of the upright post; transverse detector beam having an end connected with an upper end of the upright post; the upright detector beam having an upper end connected with the other end of the transverse detector beam, and extending downwards from the other end of the transverse detector beam so that the upright post, the transverse detector beam and the upright detector beam constitute a frame of a substantial inverted "U" shape, a ray emitted from the radiation source so as to inspect a vehicle to be inspected which passes through the inverted-"U"-shaped frame.

20 Claims, 3 Drawing Sheets

U.S. PATENT DOCUMENTS 6,928,141 B2    8/2005    Carver et al. .................. 378/57
2006/0056584 A1    3/2006    Allman et al.

FOREIGN PATENT DOCUMENTS

| CN | 1490616 A | 4/2004 |
|---|---|---|
| CN | 2715148 Y | 8/2005 |
| CN | 2715148Y A | 8/2005 |

OTHER PUBLICATIONS

English language abstract of CN1490616A dated Apr. 21, 2004, 1 page.

English language abstract of CN1295247A dated May 16, 2001, 1 page.

English language abstract of Chinese Patent Publication No. CN2715148Y, 1 page.

* cited by examiner

MOBILE VEHICLE INSPECTION SYSTEM

BACKGROUND OF THE INVENTION

1. Field of the Invention

The present invention relates to the field of radiation imaging by scanning, particularly to a mobile inspection system for small vehicles.

2. Description of the Related Art

A vehicle carried mobile container/vehicle inspection system is necessary for inspection at customs, airfields, and railroad systems. The inspection system can obtain transmission images of contents contained in containers or vehicles by scanning the containers or the vehicles without opening the containers or the vehicles. The inspection system can find suspicious objects hidden within the container or the vehicles by analyzing the images.

The vehicle carried mobile container/vehicle inspection system is integrated on a trailer chassis to constitute a so-called scanning vehicle. In prior art such as a vehicle carried mobile container/vehicle inspection system (HCV MOBIEL SYSTEM) produced by German Smiths Heimann GmbH, an upright detector beam is configured as a foldable structure, and a horizontal beam has an end coupled with the upright detector beam and another end connected with a balance weight to balance the scanning vehicle.

However, a structure for balancing the vehicle in the above inspection system is complicated. It is necessary not only to ensure the scanning vehicle to be balanced in a transverse direction when the detector beam projects from the scanning vehicle, that is, in a state of inspection scanning, but also to ensure the scanning vehicle to be balanced when the detector beam retracts into the scanning vehicle. As a result, the entire balanced vehicle increases in weight, and has a weight over 20 t so that the trailer chassis used in the vehicle is one with three or four axles, thereby resulting in a high manufacturing cost.

In addition, the above system is complicated in structure due to the foldable upright detector beam. Moreover, a scanning height of the scanning vehicle is usually from 400 mm above the ground to the top of the scanned container or vehicle, so that the scanning vehicle can scan a container lorry other than a small vehicle with a low chassis.

In order to decrease the lowest scanning height of a scanning vehicle to enlarge an applicable range of the scanning vehicle, the applicant proposed a "combined mobile container inspection apparatus with a low target" in Chinese Patent No. 2715148Y. The apparatus can enlarge a scanning range and lower a scanning target. However, an upright detector beam of a scanning vehicle of the apparatus is foldable, and it is necessary that a radiation source rotates with the beam to accomplish a balance of the scanning vehicle in a transverse direction. Therefore, the scanning vehicle is disadvantageously complicated in structure and high in cost.

SUMMARY OF THE INVENTION

In view of the above technical problems, it is at least one aspect of the present invention to provide a vehicle carried mobile inspection system or a scanning vehicle for inspecting a small vehicle. The system has an upright detector beam which is not necessary to be folded away when the vehicle runs and inspects vehicles to be inspected. The system is simple in structure, convenient in manufacturing and adjusting, large in scanning scope, light in weight, and low in cost.

According to an aspect of the present invention, there is provided a mobile vehicle inspection system comprising: a moving device; a driving device for driving the moving device to move during scanning inspection; a radiation source disposed on the moving device for emitting a ray; a rotary table pivotally disposed on the moving device; an upright post installed on the rotary table at a lower end of the upright post so as to be rotatable with the rotary table; a transverse detector beam having a first array of detectors and an end connected with an upper end of the upright post; an upright detector beam with a second array of detectors, the upright detector beam having an upper end connected with the other end of the transverse detector beam, and extending downwards from the other end of the transverse detector beam so that the upright post, the transverse detector beam and the upright detector beam constitute a frame of a substantially inverted "U" shape, wherein the transverse detector beam and the upright detector beam can swing, by pivoting the upright post, between a retracted position in which they are retracted into the moving device and a projected position in which they are projected from the moving device, and wherein when the transverse detector beam and the upright detector beam are located in the projected position, a ray emitted from the radiation source is located immediately opposite to the first array of detectors and the second array of detectors so as to inspect a vehicle to be inspected which passes through the inverted-"U"-shaped frame.

Preferably, the moving device comprises a chassis frame; and wheels mounted to a bottom of the chassis frame, wherein the radiation source and the rotary table are disposed on the chassis frame, and the driving device drives the wheels to rotate during inspection.

More preferably, the wheels comprise a pair of front wheels and a pair of rear wheels.

Moreover, the driving device drives the rear wheel to rotate during inspection.

According to a preferable embodiment, the mobile vehicle inspection system further comprises a front traction portion connected integrally with the chassis frame to drive the moving device to move.

Alternatively, the mobile vehicle inspection system further comprises an auxiliary supporting device disposed at the bottom of the chassis frame on the side of the transverse detector beam and the upright detector beam, and the auxiliary supporting device provides an auxiliary supporting for the chassis frame to keep the chassis frame balanced while the transverse detector beam and the upright detector beam are located in the projected position.

Furthermore, the auxiliary supporting device comprises a connecting base mounted to the chassis frame; a roller; a supporting arm having an end hinged to the connecting base and the other end connected with the roller through a bearing; a first hydraulic cylinder having an end hinged to the chassis frame and the other end hinged to the supporting arm at an intermediate portion of the supporting arm so as to drive the supporting arm to swing, so that the roller contacts the ground or is separated from the ground.

Furthermore, the mobile vehicle inspection system further comprises a ramp platform device for raising a vehicle to be inspected by a distance from the ground, the ramp platform device including a first ramp platform section and a second ramp platform section, wherein each of the first ramp platform section and the second ramp platform section comprises: a horizontal intermediate portion; two transition portions detachably connected with two ends of the horizontal intermediate portion, respectively; and two slope portions detachably connected with the two transition portions, respectively.

Specifically, the ramp platform device further comprises a connecting frame having a shape of a substantially rectangular parallelepiped, the intermediate portions of the first ramp platform section and the second ramp platform section being hinged to two opposite sides of the connecting frame, so that when the ramp platform device is in a detached and folded state, the detached transition portions of the first ramp platform section and the second ramp platform section can be placed in the connecting frames, the intermediate portions of the first ramp platform section and the second ramp platform section can be turned onto a top surface of the connecting frame, and the detached slope portions can be superposed on the intermediate portions.

According to a preferable embodiment of the present invention, the mobile vehicle inspection system further comprises a ramp platform support disposed to the chassis frame and a ramp platform lifting device connected to the chassis frame to lift the ramp platform device in the detached and folded state onto the ramp platform support or to move the ramp platform device in the detached and folded state from the ramp platform support to the ground.

Furthermore, the ramp platform lifting device comprises an electric hoist.

In a preferable embodiment of the present invention, the mobile vehicle inspection system further comprises a second hydraulic cylinder having an end fixedly connected with the chassis frame and the other end rotatably connected with the rotary table for driving the rotary table to pivot.

In addition, the mobile vehicle inspection system further comprises a generator chamber disposed on the chassis frame, and a generator disposed in the generator chamber.

Preferably, the mobile vehicle inspection system further comprises a radiation source water cooling unit for cooling the radiation source.

In accordance with another aspect of the present invention, there is provided a mobile vehicle inspection system comprising: a moving device; a rotary table pivotally disposed on the moving device; an upright post installed on the rotary table at a lower end of the upright post so as to be rotatable with the rotary table; a transverse detector beam having a first array of detectors and an end connected with an upper end of the upright post; an upright detector beam with a second array of detectors, the upright detector beam having an upper end connected with the other end of the transverse detector beam, and extending downwards from the other end of the transverse detector beam so that the upright post, the transverse detector beam and the upright detector beam constitute a frame of a substantially inverted "U" shape, wherein the transverse detector beam and the upright detector beam can swing, by pivoting the upright post, between a retracted position in which they are retracted to the moving device and a projected position in which they are projected from the moving device.

The vehicle carried mobile vehicle inspection system according to the present invention can scan existing small vehicles in an omnidirectional manner so as to inspect every portion of the small vehicles. In addition, the transverse detector beam and the upright detector beam are perpendicular to each other to constitute a shape of an inverted "L". In addition, it is not necessary to fold the upright detector beam so that the detector beams are simple in structure and convenient in manufacturing and adjusting.

In addition, an auxiliary supporting wheel is installed on the side from which the transverse detector beam and the upright detector beam are projected to ensure balance of the scanning vehicle after the transverse detector beam and the upright detector beam are projected. The system of the present invention is light in weight so that a compact trailer chassis with two axles can be used. Therefore, the system is low in manufacturing cost and good in economical efficiency.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE EMBODIMENTS

Figure 1:
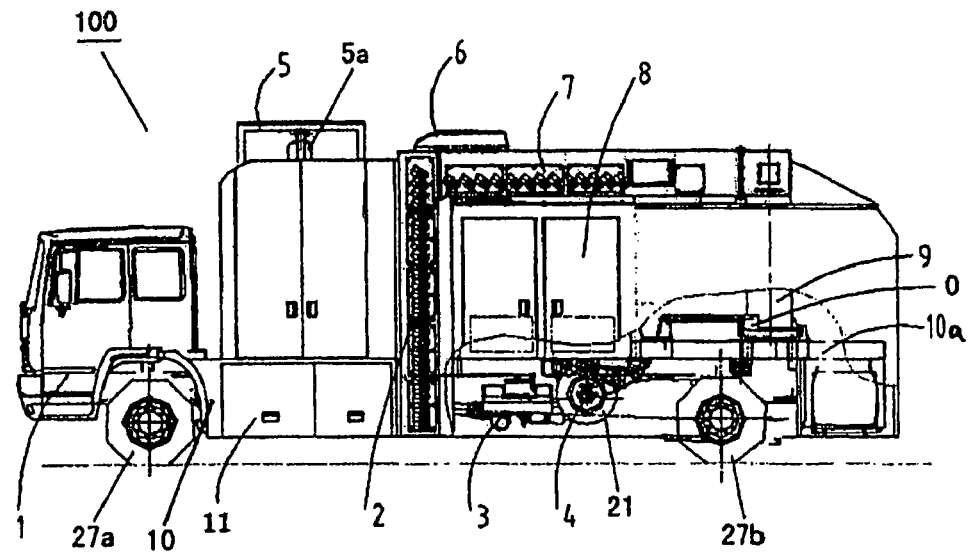
FIG. 1 is a schematic view showing a configuration of a mobile vehicle inspection system according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Referring to FIGS. 1-4, a mobile vehicle inspection system (generally called a scanning vehicle) according to an embodiment of the present invention comprises a moving device. The moving device includes a chassis frame 10 and a pair of front wheels 27*a* and a pair of rear wheels 27*b* mounted to a bottom of the chassis frame 10.

A radiation source 23 for emitting ray such as X-ray is mounted on the chassis frame 10 to scan and inspect a vehicle to be inspected or goods in the vehicle. A rotary table 0 is pivotally disposed on the chassis frame 10, and an upright post 9 is installed on the rotary table so as to be rotatable with the rotary table 0.

A transverse detector beam 7 has an end connected with an upper end of the upright post 9, and extends substantially horizontally from the upper end of the upright post 9. An upright detector beam 2 has an upper end connected with the other end of the transverse detector beam 7, and extends substantially vertically from the other end of the transverse detector beam 7, so that the upright post 9, the transverse detector beam 7 and the upright detector beam 2 constitute a frame of a substantially inverted "U" shape. The transverse detector beam 7 and the upright detector beam 2 are provided with arrays of detectors for receiving the X-ray emitted from the radiation source 23, respectively. A vehicle 22 to be inspected can pass through the inverted "U" shaped to be scanned and inspected by the X-ray emitted from the radiation source 23.

The mobile vehicle inspection system according to the embodiment of the present invention further comprises a driving device 3 for driving the moving device to move during scanning inspection. Specifically, the driving device 3 drives the rear wheels 27b only during scanning inspection. Alternatively, the driving device 3 may drive the front wheels 27b or both the front wheels 27a and the rear wheels 27b. When the system does not scan and inspect a vehicle to be inspected, that is, when the transverse detector beam 7 and the upright detector beam 2 (the inverted "U" shaped frame) are retracted to the chassis frame 10, the driving device 3 does not supply the rear wheel 27b with driving power, so that the vehicle inspection system can be driven to move from a working spot to another working spot by a front traction portion 1 or a separate motor vehicle.

Figure 2:
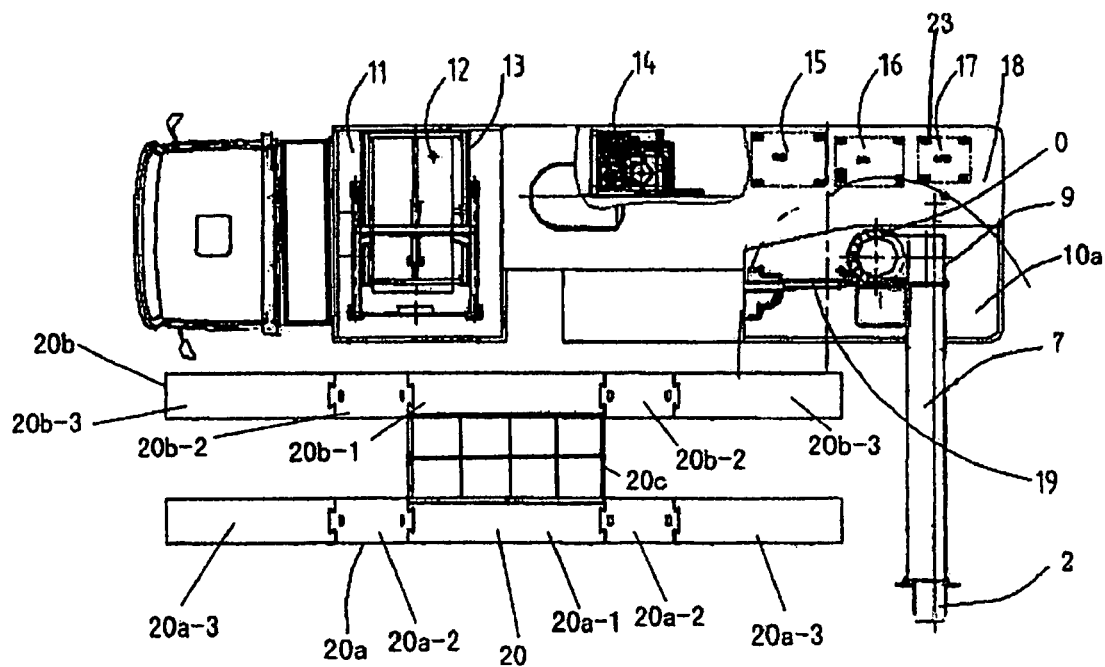
FIG. 2 is a schematic top view showing the mobile vehicle inspection system according to an embodiment of the present invention in a scanning state.
Figure 3:
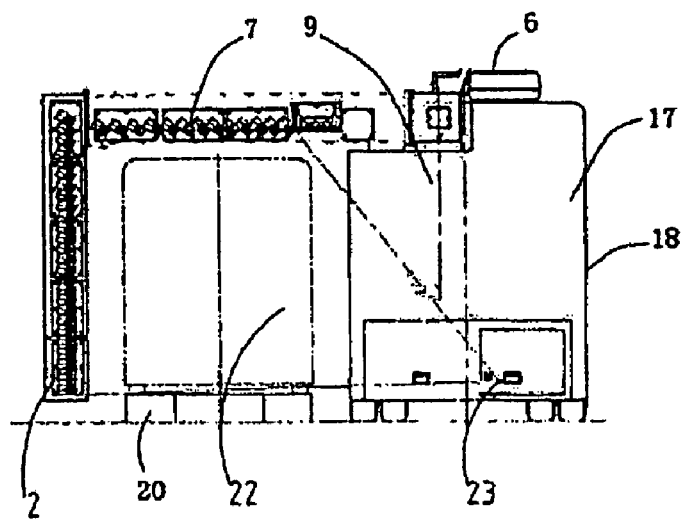
FIG. 3 is a schematic rear view showing the mobile vehicle inspection system according to an embodiment of the present invention in a scanning state.

Since the upright post 9 can rotate with the rotary table 0, the transverse detector beam 7 and the upright detector beam 2 can swing around the upright post 9 between a retracted position (as shown in FIG. 1) and a projected position (as shown in FIGS. 2 and 3). In the retracted position, the transverse detector beam 7 and the upright detector beam 2 (the inverted "U" shaped frame) are located over the chassis frame 10, and in the projected position, the transverse detector beam 7 and the upright detector beam 2 are located outside the chassis frame 10 so that a vehicle to be inspected can pass through the inverted "U" shaped frame. In addition, in the projected position, the X-ray emitted from the radiation source 23 is positioned immediately opposite the arrays of detectors of the transverse detector beam 7 and the upright detector beam 2.

The chassis frame 10 may be a general vehicle chassis frame. Preferably, the front traction portion 1 is coupled integrally with the chassis frame 10 to drive the chassis frame 10 to move during non-inspection. Power from the front traction portion 1 can be transmitted to the front wheels 27a and/or the rear wheels 27b through a gearing. Since a general vehicle chassis frame is narrow, an auxiliary chassis frame having a width larger than that of the general vehicle chassis is disposed on the general vehicle chassis frame to form a chassis frame 10 having a larger width, so that more components constituting the scanning vehicle are disposed on the chassis frame 10.

In addition, the front traction portion 1 and the driving device 3 do not simultaneously supply the chassis frame 10 with driving power. For example, during scanning inspection, the driving device 3 supplies the rear wheels 27b with the driving power to drive the chassis frame 10 to move, while the front traction portion 1 does not supply the front wheels 27a and/or the rear wheels 27b with driving power. In contrast, during non-inspection, as described above, the driving device 3 does not supply the front wheels 27a and/or the rear wheels 27b with the driving power, while the front traction portion 1 supplies the front wheels 27a and/or the rear wheels 27b with the driving power through the gearing as so to drive the chassis frame 10 to move in a same manner as a general motor vehicle is driven.

Preferably, the mobile vehicle inspection system according to the embodiment of the present invention further comprises an auxiliary supporting device 4 disposed at the bottom of the chassis frame 10 on a side of the inverted "U" shaped frame. The auxiliary supporting device 4 provides an auxiliary supporting for the chassis frame 10 to keep the chassis frame 10 balanced during inspection. The auxiliary supporting device 4 comprises a connecting base 26 mounted to the chassis frame 10; a roller 21; a supporting arm 25 having an end rotatably hinged to the connecting base 26 and the other end connected with the roller 21 through a bearing (not shown); a first hydraulic cylinder 24 having an end rotatably hinged to the chassis frame 10 and the other end rotatably hinged to the supporting arm 25 at an intermediate portion of the supporting arm 25 so as to drive the supporting arm 25 to swing, so that the roller 21 contacts the ground during inspection and the roller 21 is separated from the ground during non-inspection and is separated from the ground in a case that the inverted "U" shaped frame is not projected.

Furthermore, the mobile vehicle inspection system according to the embodiment of the present invention further comprises a ramp platform device 20 for raising a vehicle 22 to be inspected by a distance from the ground. For example, if the vehicle 22 to be inspected is a small vehicle, the X-ray emitted from the radiation source 23 can not scan a lower portion of the vehicle 22 to be inspected. Therefore, it is necessary to raise the vehicle 22 by the ramp platform device 20 as shown in FIG. 3.

Figure 5:
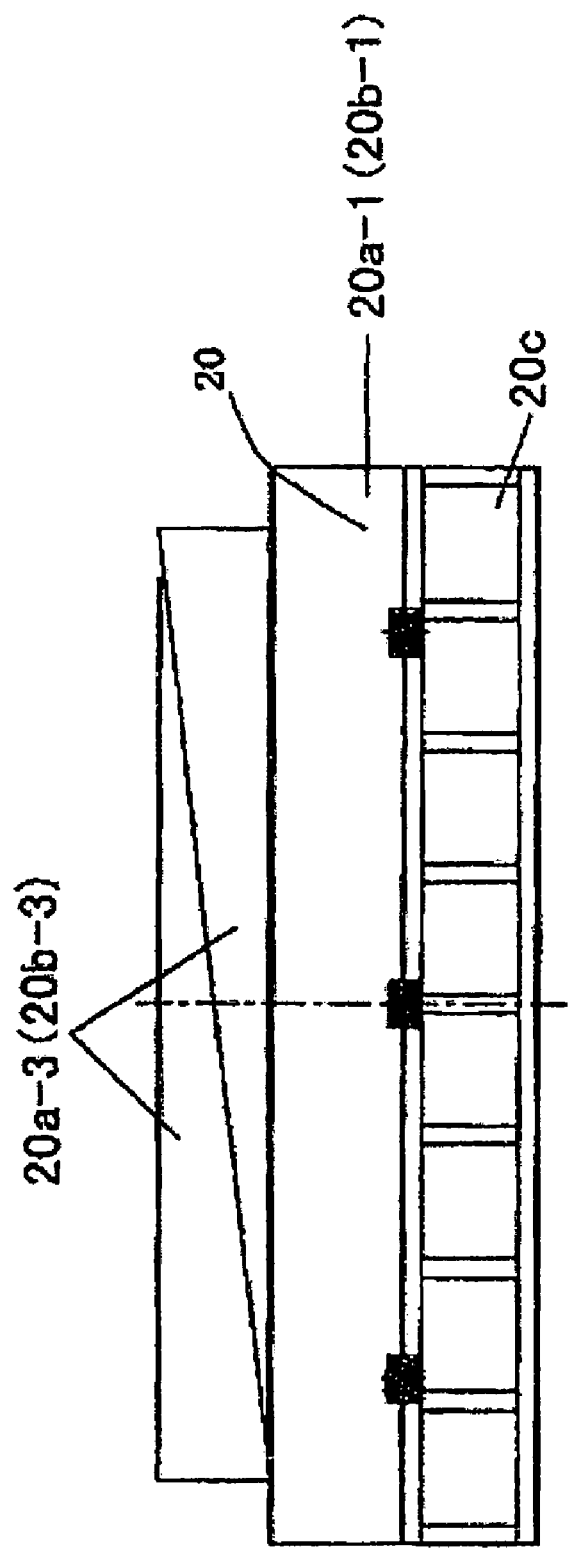
FIG. 5 is a schematic view showing a configuration of a foldable slope-platform of the mobile vehicle inspection system according to an embodiment of the present invention in which the foldable slope-platform has been folded.

The ramp platform device 20 comprises a first ramp platform section 20a and a second ramp platform section 20b. The first ramp platform section 20a includes: a horizontal intermediate portion 20a-1; two transition portions 20a-2 and 20a-2 detachably connected with two ends of the horizontal intermediate portion 20a-1 respectively; and two slope portions 20a-3 and 20a-3 detachably connected with the two transition portions 20a-2 and 20a-2 respectively. Similarly, the second ramp platform section 20b includes: a horizontal intermediate portion 20b-1; two transition portions 20b-2 and 20b-2 detachably connected with two ends of the horizontal intermediate portion 20b-1 respectively; and two slope portions 20b-3 and 20b-3 detachably connected with the two transition portions 20b-2 and 20b-2 respectively. Furthermore, the ramp platform device 20 further comprises a connecting frame 20c having a shape of a substantially rectangular parallelepiped. The intermediate portions 20a-1 and 20b-1 of the first ramp platform section 20a and the second ramp platform section 20b are hinged to two opposite sides of the connecting frame 20c, so that when the ramp platform device 20 is in a detached and folded state, the detached transition portions 20a-2, 20a-2, 20b-2 and 20b-2 of the first ramp platform section 20a and the second ramp platform section 20b can be placed in the connecting frames 20c, the intermediate portions 20a-1 and 20b-1 of the first ramp platform section 20a and the second ramp platform section 20b can be turned over onto a top surface of the connecting frame 20c, and the detached slope portions 20a-3, 20a-3, 20b-3 and 20b-3 can be superposed on the intermediate portions 20a-1 and 20b-1, as shown in FIG. 5.

The vehicle inspection system according to the embodiment of the present invention further comprises a ramp platform support 13 disposed to the chassis frame 10 and a ramp platform lifting device 5 connected with the chassis frame 10 to lift the ramp platform device 20 in the detached and folded state onto the ramp platform support 13 or to move the ramp platform device 20 in the detached and folded state from the ramp platform support 13 to the ground. Preferably, the ramp platform lifting device 5 comprises an electric hoist.

In an example of the embodiment of the present invention, the vehicle inspection system further comprises a second hydraulic cylinder 19 having an end fixed to the chassis frame 10 and the other end rotatably connected with the rotary table 0 for driving the rotary table 10 to rotate, so as to rotate the inverted "U" shaped frame composed of the upright post 9, the transverse detector beam 7 and the upright detector beam 2 between the retracted position and the projected position.

The vehicle inspection system according to the embodiment of the present invention further comprises a generator chamber 11 disposed on the chassis frame 10, a generator 12 disposed in the generator chamber 11 for supplying the vehicle inspection system with electric power, and a controlling device for controlling the generator 12. Alternatively, an outer power source can be used to supply the vehicle inspection system with electric power. More preferably, the mobile vehicle inspection system further comprises a radiation source water-cooling unit 16 for cooling the radiation source 23.

As described above, during non-inspection, that is, when the transverse detector beam 7 and the upright detector beam 2 (the inverted "U" shaped frame) are retracted to the chassis frame 10, the chassis frame 10 (the moving device) of the vehicle inspection system may be driven by the front traction portion 1 connected integrally with the chassis frame 10 or by the separate motor vehicle (not shown).

In addition, other components of the vehicle inspection system can be disposed on the chassis frame 10. For example, a control chamber 8 is installed at an intermediate portion of the chassis frame 10, and an equipment chamber 18 is installed on a side at a rear portion of the chassis frame 10. A scanning controlling module, an image obtaining module, an operation inspection module, and a hydraulic pumping station 14 are disposed in the control chamber 8. A control cabinet 15, an electronic device cabinet 17, and the radiation source water-cooling unit 16 are installed in the equipment chamber 18. An air conditioning unit 6 is installed on a top of the control chamber 8 to cool and heat the control chamber 8 and the equipment chamber 18. The rotary table 0 may be disposed on a side of the equipment chamber 18. The ramp platform support 13 and the slope-platform lift device 5 may be installed on a top of the generator chamber 11.

An operation of the mobile vehicle-inspection system (the scanning vehicle) according the embodiment of the present invention is described as follows.

Referring to FIG. 1 in which the scanning vehicle is in a non-inspection state, the transverse detector beam 7 and the upright detector beam 2 are retracted to abut against a side of the control chamber 8, the roller 21 is spaced from the ground by drawing the supporting arm 25 with the first hydraulic cylinder 24, so that it can be ensured that the scanning vehicle can be driven to normally run on a road by the front traction portion 1. In addition, the ramp platform device 20 is in the detached and folded state, as shown in FIG. 5, and fixed on the ramp platform support 13. As a result, it is not necessary to use other vehicles to carry the ramp platform device 20.

Figure 4:
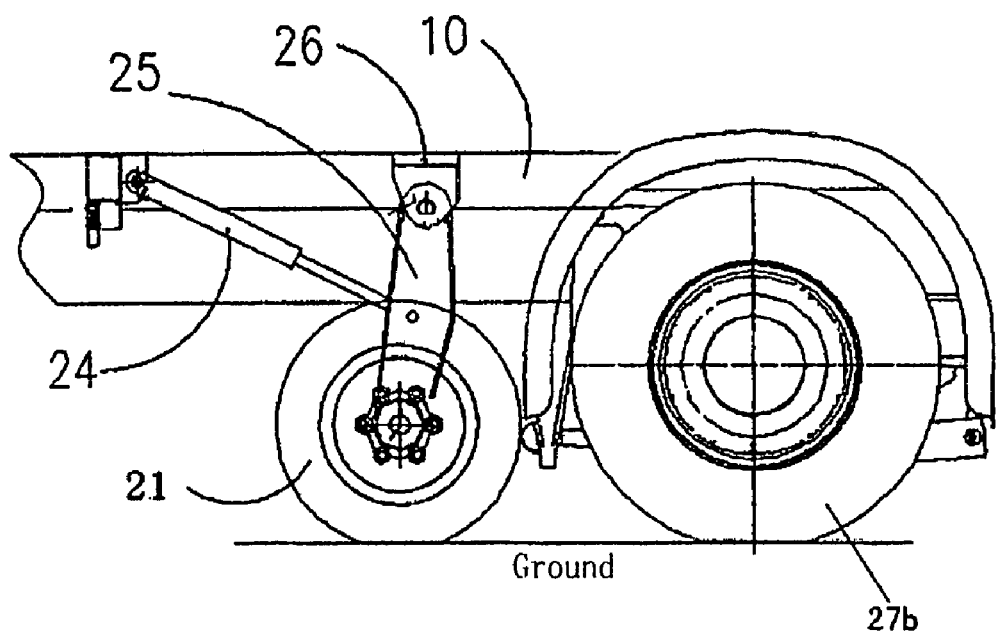
FIG. 4 is a schematic view showing a configuration of an operation state of an auxiliary supporting wheel of the mobile vehicle inspection system according to an embodiment of the present invention.

Referring to FIGS. 2 and 3 in which the scanning vehicle according to the present invention is in a scanning inspection state, the transverse detector beam 7 and the upright detector beam 2 are projected in the following manner. After the scanning vehicle stops and becomes stable, an operator for the system powers on the scanning vehicle and starts the hydraulic pumping station 14, and the first hydraulic cylinder 24 is actuated by a hydraulic system. A piston rod of the first hydraulic cylinder 24 is projected to push the supporting arm 25 so that the supporting arm 25 drives the roller 21 to rotate in an anticlockwise direction shown in FIG. 4 until the roller 21 contacts the ground, as shown in FIG. 4. The hydraulic system actuates the second hydraulic cylinder 19. The second hydraulic cylinder 19 drives the rotary table 0 to rotate, so that the transverse detector beam 7 and the upright detector beam 2 (the inverted "U" shaped frame) are projected from the chassis frame 10 to be substantially perpendicular to a longitudinal axis of the chassis frame 10.

Next, the operator moves the ramp platform device 20 in the detached and folded state by the ramp platform lifting device 5 from the ramp platform support 13 onto the ground. Then, the ramp platform device 20 is assembled as shown in FIGS. 2 and 3. A vehicle 22 to be inspected is driven onto the assembled ramp platform device 20, and a driver of the scanning vehicle leaves the scanning vehicle. The scanning vehicle is driven to advance by the driving device 3, and the X-ray emitted from the radiation source 23 penetrates and scans the vehicle 22 resting on the ramp platform device 20, so that image of goods in the vehicle 22 is obtained. Operation for image obtaining and imaging control is identical to that existing in the prior art, and thus a detailed description of the operation is omitted.

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A mobile vehicle inspection system comprising:
   a moving device;
   a driving device for driving the moving device to move during scanning inspection;
   a radiation source disposed on the moving device for emitting a ray;
   a rotary table pivotally disposed on the moving device;
   an upright post installed on the rotary table at a lower end of the upright post so as to be rotatable with the rotary table;
   a transverse detector beam with a first array of detectors, the transverse detector beam having an end connected with an upper end of the upright post;
   an upright detector beam with a second array of detectors, the upright detector beam having an upper end connected with the other end of the transverse detector beam, and extending downwards from the other end of the transverse detector beam so that the upright post, the transverse detector beams, and the upright detector beam constitute a frame of a substantially inverted "U" shape,
   wherein the transverse detector beam and the upright detector beam can swing, by pivoting the upright post, between a retracted position in which they are retracted to the moving device and a projected position in which they are projected from the moving device, and wherein when the transverse detector beam and the upright detector beam are located in the projected position, a ray emitted from the radiation source is located immediately opposite the first array of detectors and the second array of detectors so as to inspect a vehicle to be inspected which passes through the frame, and when the transverse detector beam and the upright detector beam are located in the retracted position, the transverse detector beam and the upright detector beam remain in the substantially inverted "U" shape.

2. The mobile vehicle inspection system according to claim 1, wherein the moving device comprises:
   a chassis frame; and
   wheels mounted to a bottom of the chassis frame, wherein the radiation source and the rotary table are disposed on the chassis frame, and the driving device drives the wheels to rotate during inspection.

3. The mobile vehicle inspection system according to claim 2, wherein the wheels comprise at least one pair of front wheels and at least one pair of rear wheels.

4. The mobile vehicle inspection system according to claim 3, wherein the driving device drives one pair of rear wheels of the at least one pair of rear wheels or one pair of front wheels of the at least one pair of front wheels to rotate during inspection.

5. The mobile vehicle inspection system according to claim 2, further comprising a front traction portion connected integrally with the chassis frame to drive the moving device to move.

6. The mobile vehicle inspection system according to claim 5, further comprising an auxiliary supporting device disposed at the bottom of the chassis frame on a side of the transverse detector beam and the upright detector beam, the auxiliary supporting device providing an auxiliary support for the chassis frame to keep the chassis frame balanced while the transverse detector beam and the upright detector beam are located in the projected position.

7. The mobile vehicle inspection system according to claim 6, wherein the auxiliary supporting device comprises:
   a connecting base connected with the chassis frame;
   a roller;
   a supporting arm having an end hinged to the connecting base and the other end connected with the roller through a bearing;
   a first hydraulic cylinder having an end hinged to the chassis frame and the other end hinged to the supporting arm at an intermediate portion of the supporting arm so as to drive the supporting arm to swing, so that the roller contacts the ground or is separated from the ground.

8. The mobile vehicle inspection system according to claim 7, further comprising a ramp platform device for raising a vehicle to be inspected by a distance from the ground, the ramp platform device including a first ramp platform section and a second ramp platform section, wherein each of the first ramp platform section and the second ramp platform section comprises:
   a horizontal intermediate portion;
   two transition portions detachably connected with two ends of the horizontal intermediate portion, respectively; and
   two slope portions detachably connected with the two transition portions, respectively.

9. The mobile vehicle inspection system according to claim 8, the ramp platform device further comprises a connecting frame having a shape of a substantially rectangular parallelepiped, the intermediate portions of the first ramp platform section and the second ramp platform section being hinged to two opposite sides of the connecting frame, so that when the ramp platform device is in a detached and folded state, the detached transition portions of the first ramp platform section and the second ramp platform section can be placed in the connecting frames, the intermediate portions of the first ramp platform section and the second ramp platform section can be turned over onto a top surface of the connecting frame, and the detached slope portions can be superposed on the intermediate portions.

10. The mobile vehicle inspection system according to claim 9, further comprising a ramp platform support mounted to the chassis frame and a ramp platform lifting device connected to the chassis frame for lifting the ramp platform device in the detached and folded state onto the ramp platform support or for moving the ramp platform device in the detached and folded state from the ramp platform support to the ground.

11. The mobile vehicle inspection system according to claim 10, the ramp platform lifting device comprises an electric hoist.

12. The mobile vehicle inspection system according to claim 2, further comprising a second hydraulic cylinder having an end connected with the chassis frame and the other end rotatably connected with the rotary table for driving the rotary table to pivot.

13. The mobile vehicle inspection system according to claim 2, further comprising:
   a generator chamber disposed on the chassis frame, and
   a generator disposed in the generator chamber.

14. The mobile vehicle inspection system according to claim 13, further comprising: a radiation source water-cooling unit for cooling the radiation source.

15. A mobile vehicle inspection system comprising:
   a moving device;
   a rotary table pivotally disposed on the moving device;
   an upright post installed on the rotary table at a lower end of the upright post so as to be rotatable with the rotary table;
   a transverse detector beam with a first array of detectors, the transverse detector beam having an end connected with an upper end of the upright post;
   an upright detector beam with a second array of detectors, the upright detector beam having an upper end connected with the other end of the transverse detector beam, and extending downwards from the other end of the transverse detector beam so that the upright post, the transverse detector beam, and the upright detector beam constitute a frame of a substantially inverted "U" shape,
   wherein the transverse detector beam and the upright detector beam can swing, by pivoting the upright post, between a retracted position in which they are retracted to the moving device and a projected position in which they are projected from the moving device, and when the transverse detector beam and the upright detector beam are located in the retracted position, the transverse detector beam and the upright detector beam remain in the substantially inverted "U" shape.

16. The mobile vehicle inspection system according to claim 15, further comprising an auxiliary supporting device disposed at the bottom of a chassis frame on a side of the transverse detector beam and the upright detector beam, the auxiliary supporting device providing an auxiliary support for the chassis frame to keep the chassis frame balanced while the transverse detector beam and the upright detector beam are located in the projected position.

17. The mobile vehicle inspection system according to claim 16, wherein the auxiliary supporting device comprises:
   a connecting base connected with the chassis frame;
   a roller;
   a supporting arm having an end hinged to the connecting base and the other end connected with the roller through a bearing;
   a first hydraulic cylinder having an end hinged to the chassis frame and the other end hinged to the supporting arm at an intermediate portion of the supporting arm so as to drive the supporting arm to swing, so that the roller contacts the ground or is separated from the ground.

18. The mobile vehicle inspection system according to claim 17, further comprising a ramp platform device for raising a vehicle to be inspected by a distance from the ground, the ramp platform device including a first ramp platform section and a second ramp platform section, wherein each of the first ramp platform section and the second ramp platform section comprises:
   a horizontal intermediate portion;
   two transition portions detachably connected with two ends of the horizontal intermediate portion, respectively; and
   two slope portions detachably connected with the two transition portions, respectively.

19. The mobile vehicle inspection system according to claim 18, the ramp platform device further comprises a connecting frame having a shape of a substantially rectangular parallelepiped, the intermediate portions of the first ramp platform section and the second ramp platform section being hinged to two opposite sides of the connecting frame, so that when the ramp platform device is in a detached and folded state, the detached transition portions of the first ramp platform section and the second ramp platform section can be placed in the connecting frames, the intermediate portions of the first ramp platform section and the second ramp platform section can be turned over onto a top surface of the connecting frame, and the detached slope portions can be superposed on the intermediate portions.

20. The mobile vehicle inspection system according to claim 19, further comprising a ramp platform support mounted to the chassis frame and a ramp platform lifting device connected to the chassis frame for lifting the ramp platform device in the detached and folded state onto the ramp platform support or for moving the ramp platform device in the detached and folded state from the ramp platform support to the ground.

\* \* \* \* \*